US012712903B2

(12) United States Patent
Narayanan et al.

(10) Patent No.: US 12,712,903 B2
(45) Date of Patent: Aug. 18, 2026

(54) LLM-GENERATED ANOMALY AND SECURITY THREAT SUMMARIES

(71) Applicant: MICRO FOCUS LLC, Wilmington, DE (US)

(72) Inventors: Asad Narayanan, Ottawa (CA); Maria Pospelova, Ottawa (CA); Mahsa Khosravi, Ottawa (CA); Nakkul Khuraana, Ottawa (CA); Hari Manassery Koduvely, Ottawa (CA)

(73) Assignee: Micro Focus LLC, Austin, TX (US)

( * ) Notice: Subject to any disclaimer, the term of this patent is extended or adjusted under 35 U.S.C. 154(b) by 0 days.

(21) Appl. No.: 18/950,109

(22) Filed: Nov. 17, 2024

(65) Prior Publication Data

US 2026/0142988 A1 May 21, 2026

(51) Int. Cl.
*H04L 9/40* (2022.01)

(52) U.S. Cl.
CPC ................................ *H04L 63/1425* (2013.01)

(58) Field of Classification Search
None
See application file for complete search history.

(56) References Cited

U.S. PATENT DOCUMENTS

| | | | | |
|---|---|---|---|---|
| 9,516,053 | B1 * | 12/2016 | Muddu | G06V 10/225 |
| 10,673,880 | B1 * | 6/2020 | Pratt | H04L 63/1425 |
| 12,293,420 | B2 * | 5/2025 | Reddy | G06Q 20/389 |
| 12,519,813 | B1 * | 1/2026 | Pratt | H04L 63/1425 |
| 2023/0206348 | A1 * | 6/2023 | Reddy | G06Q 20/389 705/30 |
| 2024/0356934 | A1 * | 10/2024 | Skarda | H04L 63/20 |

* cited by examiner

*Primary Examiner* — Trang T Doan
(74) *Attorney, Agent, or Firm* — Sheridan Ross P.C.

(57) ABSTRACT

First anomalies are selected from those identified by security analysis, and are enhanced with additional information. Second anomalies occurring within a specified time period and regarding a specified entity, including at least one of the first anomalies, are also selected. A prompt is generated based on the second anomalies. The prompt is generated to solicit a response from a large language model (LLM) including a natural language summary synthesizing the second anomalies. The second anomalies are also evaluated against a database to identify related security threats. Scores for these security threats are generated, and a subset of the threats is selected based on the scores. Another prompt is generated based on the second anomalies and based on the selected subset of security threats. The prompt is generated to solicit a response from an LLM including a natural language summary associating the security threats with the second anomalies.

20 Claims, 14 Drawing Sheets

Based on the data the user bob.jones initiated a rare process on Mar 31st, 2024 between 1 pm and 2 pm, which makes them risky. This anomaly is for the execution of an unusual process that is rarely seen. the process name is tee, (high importance), and it has been seen rarely by that user and several times by the population. This process is used to split the output of a program so that it can be both displayed and saved in a file. This process was initiated 3 times with 3 different process instances, 2 unique hashes, and 3 different command lines. Two of these instances have the same parent process as cmd.exe (default importance) and cmd.exe process is rarely seen by the user and the population. cmd.exe is the command-line interpreter for Windows operating systems, used for executing commands and running batch scripts. The other parent is bash (high importance) seen several times by the user and the population. The bash process is used to run scripts. For all three instances, the grandparent is missing from the data. The API call result from [vendor 1] indicates that one of the hashes is good and one of the hashes is bad. The API call result from [vendor 2] indicates that the harmless score for that process hash is 0 and the malicious score is 10. The bad hash with malicious value is c716c28c19c85b24ec5d96fdf4171354aefd412b0f92c5f122. *The process 'tee' is associated with the following MITRE attack techniques: T1082 (Reads software policies), T1033 (get session user name), T1055 (write process memory), T1083 (check if file exists), T1087 (get session user name).*

On Jan 18th, 2024, the user bob.jones@company.com displayed several anomalous activities. These anomalies include an unusual number of failed login attempts across various destinations, an unusual number of successful logins at distinct destinations, and an unusual number of failed and successful logins to the 'domain0' server. Moreover, the user ran several rarely used services or processes, such as searchindexer.exe, elevation_service.exe, securityhealthservice.exe, wmic.exe, and runonce.exe, with high importance. The user also generated an unusually large number of 'Created' and 'Connected' events per hour beyond their typical baselines and historical maximums.

Based on the data, the user bob.jones@company.com exhibited several anomalous activities on Jan 18th, 2024. These anomalies include the execution of unusual processes, such as wmic.exe, runonce.exe, and an exceptionally large number of events of specific types, which may indicate an attempt to exfiltrate data, launch a denial-of-service attack, or execute unauthorized actions. The user may be attempting to bypass security controls or evade monitoring. The processes may be a known malware or a custom tool used by attackers. Additionally, the user's login activity is unusual, with multiple login failures across various destinations, multiple login successes at distinct destinations, and a login success from an unusual location or an unrecognized device. This behavior can lead to data breaches and unauthorized system access. The user may have a compromised account or be a target of a brute force attack or phishing attempt. The user bob.jones@company.com executed the following processes: wmic.exe, runonce.exe, and the process hash for these processes is considered good according to the API call results from [vendor 1] and [vendor 2]. However, the command line for the runonce.exe process is missing in the data, which may indicate an attempt to hide the true purpose of the process. The user also generated an exceptionally large number of events of specific types, which may indicate a potential insider threat or a compromised account. The servers involved in the anomalies are all_servers, and the volume type accessed is local. Further investigation is required to determine the root cause of these anomalies and to mitigate any potential threats.

Based on the data, the user john.doe@company.com exhibited several anomalous activities on October 10th, 2023. These anomalies include an unusual number of days with login successes for the user on specific servers, such as ad.0905.someserver.com, as well as an unusual number of days with login successes across multiple servers. Additionally, the user executed several unusual processes, including hikaru.exe, reg.exe with high importance, and eot2s03lk2ls.exe, which is rarely seen for this user and has a high importance.

The MITRE attack framework for this anomaly would be:
T1110 - Brute Force: The unusual number of days with login successes for the user on specific servers and across multiple servers could indicate a brute force attack or a compromised account.

T1021 - Command and Control: The execution of the process eot2s03lk2ls.exe, which is rarely seen for this user and has a high importance, could be indicative of command and control activities.

LLM-GENERATED ANOMALY AND SECURITY THREAT SUMMARIES

BACKGROUND

A significant if not the vast majority of computing devices are globally connected to one another via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyberattacks that likewise were unimaginable decades ago.

BRIEF DESCRIPTION OF THE DRAWINGS

FIG. 3A is a diagram of an example NL summary that may be generated in the process of FIG. 2A.

FIGS. 5A and 5B are diagrams of example NL summaries that may be generated in the process of FIG. 4.

FIG. 6B is a diagram of an example process for generating a database of security threats against which selected anomalies are evaluated in the process of FIG. 6A to identify which of the threats they are related to.

FIG. 7 is a diagram of an example NL summary that may be generated in the process of FIG. 6A.

DETAILED DESCRIPTION

Figure 1:
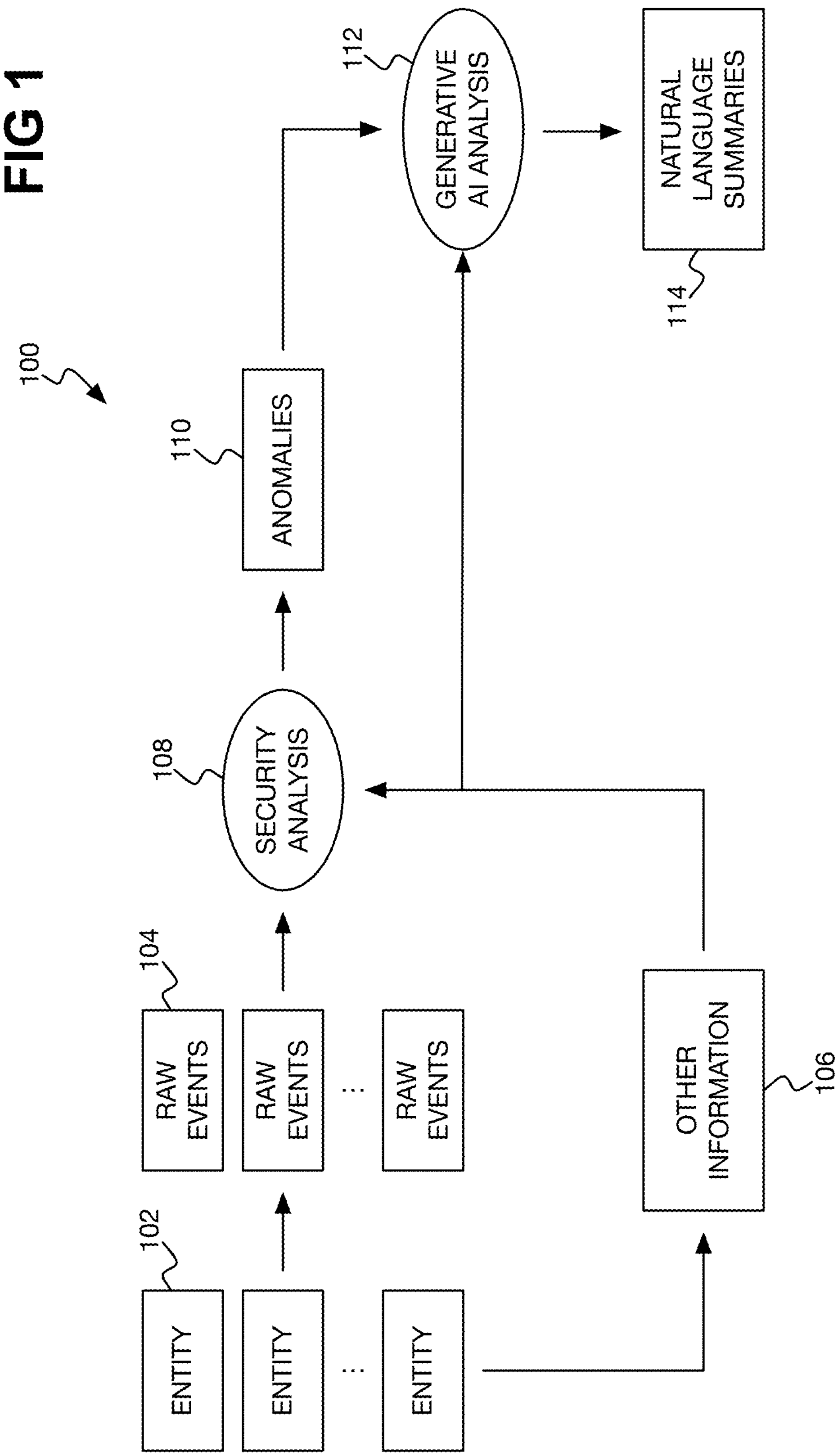
FIG. 1 is a diagram of an example architecture in which generative artificial intelligence (AI) analysis may be employed to generate natural language (NL) summaries regarding anomalies and security threats.

As noted in the background, a large percentage of the world's computing devices can communicate with one another over the Internet, which is generally advantageous. Computing devices like servers, for example, can provide diverse services, including email, remote computing device access, electronic commerce, financial account access, and so on. However, providing such a service can expose a server computing device to cyberattacks, particularly if the software underlying the services has security vulnerabilities that a nefarious party can leverage to cause the application to perform unintended functionality and/or to access the underlying server computing device.

Individual servers and other devices of a target system, including network devices (e.g., firewalls and routers) and computing devices other than server computing devices, may output log entries or other discrete pieces of data that indicate status and other information regarding their hardware, software, and communication. Such communication can include intra- and inter-device communication as well as intra-network (i.e., between devices on the same network) and inter-network (i.e., between devices on different networks, such as devices connected to one another over the Internet) communication.

Such discrete pieces of data may be referred to as raw events. Raw events can also include interactions between users and machines. For example, when a user logs onto a machine, a raw event may be created to indicate this. Similarly, when a universal serial bus (USB) device, such as a USB storage device, is connected to a computing device, a corresponding raw event may be created. As a third example, when a process is executed on a computing device, a raw event may be created to indicate this.

To detect potential security vulnerabilities and potential cyberattacks by nefarious parties, as well as other security issues, voluminous amounts of raw events may be collected and analyzed in an offline or online manner to identify such security issues or incidents. The terminology raw event is used generally herein, and encompasses all types of data that such devices may output. The data encompassed under the rubric of raw events can include that which may be referred to as messages in addition to log events, as well as that which may be stored in databases or files of various formats.

An enterprise or other large organization may have a large number of servers and other devices, within one or multiple target systems, for which raw events are generated. The raw events may be consolidated so that they can be analyzed en masse. Some security threats and other issues, for instance, may be more easily detected or may only be able to be detected by analyzing interrelationships among the raw events collected by multiple devices of a target system. Analyzing the raw events from just one computing device of a target system may not permit such security or other issues to be detected.

A traditional information and event management (SIEM) system can receive raw events regarding devices of a target system (e.g., "sources") and provides initial analyses of the raw events. The raw events can lead to generated anomalies and risk scores using an analytical approach that can be referred to as user and entity behavioral analytics (UEBA).

The UEBA capability may be a separate component from the SIEM capability, or may be included in the same SIEM system, such as an advanced version referred to as next-generation SIEM. The terminology "UEBA system" is used herein to reference the system that can generate anomalies of entities, as well as other information such as risk scores, regardless of whether that capability is a separate component from a SIEM system, or embedded within a SIEM as a next-generation SIEM system.

An example of a SEIM that provide for UEBA capability is the ArcSight Enterprise Security Manager (ESM) security information and event management (SEIM) platform, available from OpenText Corp. of Waterloo, Canada. A UEBA system thus consolidates the raw events received from the devices of a target system and provides initial analysis to identify security issues.

A security issue can signify potential and actual cyberattacks and other security threats to which devices may be currently or have previously been subjected, as well as security vulnerabilities of the devices that may render them vulnerable to such security threats.

A small UEBA system may collect raw events from hundreds of sources, and may receive more than 1,000 raw events per second. A large UEBA system may have thousands of sources, and may receive events numbering in the tens of thousands per second. Skilled personnel, who may be referred to as security threat hunters, have to efficiently analyze the information collected by a UEBA system to identify security issues to which the devices are currently or have previously been subjected. Due to the voluminous amount of data collected, the UEBA system thus provides an initial processing and analysis of the raw events, in the form of anomalies and other information, so that the threat hunters can better identify security issues that the anomalies may indicate.

An anomaly may be considered an event that that infrequently or rarely occurs. An anomaly can concern a single entity, such as a single computing device, user account, login, and so on. An unusual event (i.e., an anomaly), however, may or may not signify a security issue such as a security threat. The UEBA system can generate a risk score for an entity based on the anomalies that it identified for that entity, as well as other information. The risk score of an entity is indicative of that entity being (currently or in the past) subject to any security issue.

Even with the initial analyses provided by UEBA systems in the form of anomalies, risk scores, and other information, security threat hunters still have expend significant effort to identify actual—or at least likely, probable, or potential—security issues that may be afflicting the entities. Identification of anomalies, for instance, is still a relatively low level analysis that by itself does not constitute identification of security threats the entities are experiencing or other security issues. Stated another way, identification of anomalies is by itself not sufficient to indicate whether an entity has a security issue.

Techniques described herein, by comparison, generate higher level analyses from the results of the initial analyses performed by UEBA systems, to even better assist security threat hunters in identifying actual security issues afflicting the entities. The techniques leverage generative artificial intelligence (AI) models, particularly large language models (LLMs), to create summaries based on the anomalies identified by the initial analyses performed on the raw events regarding entities. Different types of summaries can be created to assist the threat hunters in this respect.

As a first example, an anomaly identified by the initial analysis performed by a UEBA system may be enriched or enhanced using generative AI to provide more comprehensive details regarding the anomaly. In the case of rare process anomalies, which are processes that are rarely or otherwise infrequently observed being executed on an entity, additional information from raw events regarding the process, as well as whether the process relates to known security threat techniques, can be provided to an LLM to generate a natural language (NL) summary of the process that is clear and actionable.

As a second example, the anomalies that have been identified for a specified entity within a specified period of time may be synthesized by an LLM into a NL summary that provides an overall understanding of the entity's behavior. While a UEBA system consolidates raw events to identify anomalies of an entity and aggregates the anomalies to compute a risk score, a security threat hunter still has to review the individual anomalies for a risky entity to determine whether the anomalies denote an actual security threat. The synthesis of the anomalies reduces the amount of time to perform this determination.

As a third example, the anomalies that have been identified for a specified entity within a specified period of time may further be mapped to known security threat techniques, with an LLM then used to generate a NL summary of this mapping. It is not straightforward to associate identified anomalies with known security threats. Simply performing retrieval-augment generation (RAG) to ground an LLM with information regarding known security threats, for instance, has been found to be suboptimal, leading to LLM-generated summaries that can include hallucinations and provide non-deterministic results.

FIG. 1 shows an example architecture 100 in which generative AI can be employed to generate the types of NL summaries noted above. In the architecture 100, raw events 104 regarding entities 102 are generated. As also noted above, an entity 102 can be a computing device, a user account, an individual login, and so on. Raw events 104 for an entity 102 can be in the form of log entries and other discrete pieces of data generated by or regarding the entity 102 during its operation, as similarly noted above.

An initial security analysis 108 is performed on the raw events 104 regarding the entities 102 to identify anomalies 110. The security analysis 108 may be performed by a UEBA system, for instance, and may also consider other information 106, such as attribute information regarding an entity 102. For example, for an entity 102 that is a computing device, the attribute information may include the software installed on the device as well as the hardware of that device. For an entity 102 that is a user account, the attribution information can include details regarding the person to whom the user account concerns, such as the person's role in an organization, the user account groups to which the person belongs, and so on.

Generative AI analysis 112 is then performed on the anomalies 110 identified by the initial security analysis 108 (i.e., as may be performed by a UEBA system) to generate NL summaries 114. Three ways in which NL summaries 114 can be generated—examples of which have been summarized above—are described herein. These ways can be performed separately or in combination with one another. Integration of all three ways is particularly described herein. A security threat hunter can thus utilize the NL summaries 114 to more quickly discern the actual security threats that an entity 102 may be experiencing, without having to painstakingly review every anomaly 110.

Figure 2A:
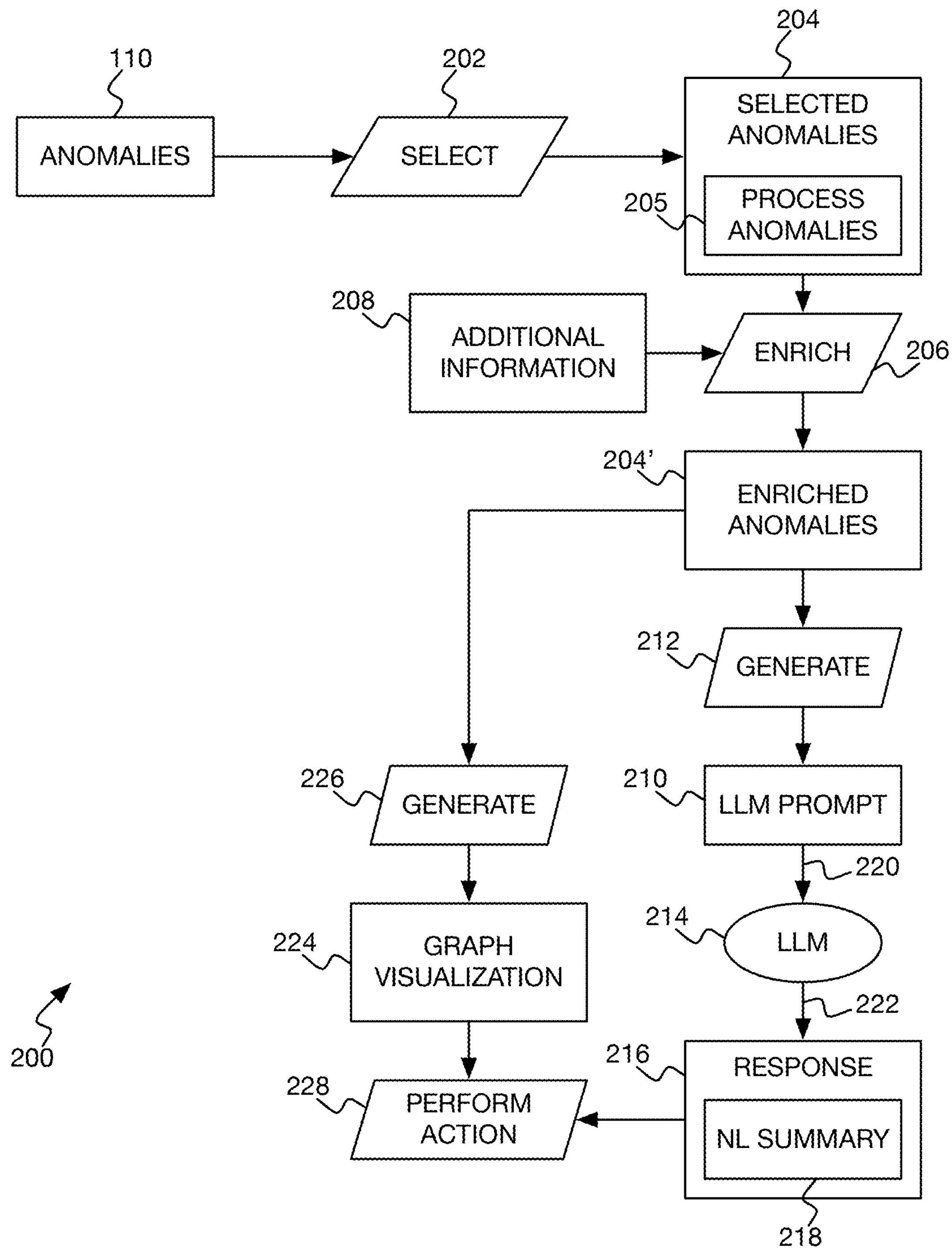
FIG. 2A is a diagram of a first example process to generate a NL summary of selected anomalies.

FIG. 2A shows an example process 200 for generating NL summaries of selected anomalies 110. The process 200 enriches, or enhances, an anomaly 110 with additional information to assist a security threat hunter in understanding the anomaly 110. The process 200 may be realized as a method performed by a computing system, and may be implemented by program code stored on a non-transitory computer-readable data storage medium that a processor executes to perform the method.

The process 200 includes selecting (202) one or more anomalies 204 from the anomalies 110 that have been identified by the initial security analysis 108 performed on the raw events 104 regarding the entities 102. The anomalies 204 that are selected may be those that are rare. A rare anomaly 204 may be one that is rarely or otherwise infrequently on a given entity 102, such as in satisfaction of a criterion.

For example, a criterion particular to a given entity 102 may be that a type of anomaly 110 has not been identified for the entity 102 in the last number of days or other period of time, and/or that it has occurred less than a threshold number of times during this period of time. An anomaly 110 of a given type may thus be identified as being rare for one entity 102 where it is not for another entity 102, if the latter entity 102 routinely exhibits the anomaly 110 but the former entity 102 does not. As another example, a more general criterion may be that a type of anomaly 110 has occurred than a threshold number of times during a given period of time, regardless of the identity of the entity 102.

The selected anomalies 204 can include process anomalies 205, such as rare process anomalies. A process anomaly 205 specifies a process executing on a corresponding entity 102 that satisfies a criterion as to the process not usually executing on this entity 102. The criterion may be as has been described above. A process may be considered an instance of a computer program's program code that is being executed on an entity 102. A specific manner by which process anomalies 205 in particular can be culled to identify those of highest importance is described below in relation to FIG. 2B.

The selected anomalies 204 are enriched (206), or enhanced, with additional information 208. For example, the raw events 104 related to a selected anomaly 204, on which basis the initial security analysis 108 identified the anomaly 204, may be retrieved for inclusion as part of the additional information 208. The type of additional information 208 by which the anomalies 204 can be enhanced is not limited to such related raw events 104, however. A specific type of additional information 208 that can be used to enhance process anomalies 205 in particular is also described below in relation to FIG. 2B.

However, another type of information that can be retrieved and included in the additional information 208 for a process anomaly 205 is information regarding a process hierarchy of the process specified by the anomaly 205. The process hierarchy can include either or both of a parent process and a grandparent process of the process that have also been executing on the entity 102 in question, as well as any other executing processes above the process in the hierarchy, and any children processes or other processes below the process in the hierarchy.

Information regarding an importance level of the process specified by the process anomaly 205, a description of the process, and/or a command-line instruction used to invoke the process, can also be retrieved and included as part of the additional information 208. The description of the process can include information retrieved from a knowledge base as to what the process is. The importance level of the process may be the priority level at which the process has been executing on the entity 102 in question, and/or whether the process is executing as a system or kernel process or as a user process on the entity 102. The command-line instruction used to invoke the process can be the name of the file that is entered to initiate execution of the process.

The amount of time that a process specified by a process anomaly 205 has been executing on the entity 102 in question, and/or the amount of time that the process has been executing on any entity of a group of entities including this entity 102, may also be retrieved and included as part of the additional information 208. As to the latter amount of time, for instance, the entities 102 that perform similar functionality—may be grouped together. For example, if a system employs a number of computing devices to serve client requests for a database, these devices may be grouped together.

The selected anomalies 204 as enriched or enhanced with additional information 208 are identified in the figure as the selected anomalies 204'. A LLM prompt 210 is generated (212) based on the selected anomalies 204' (i.e., the anomalies 204 as have been enhanced) to input to an LLM 214. The prompt 210 is generated to solicit a response 216 from the LLM 214 that includes a NL summary 218 of the selected anomalies 204. An example of a NL summary 218 is shown in FIG. 3A. Furthermore, an example generalized form of the LLM prompt 210, as well as of LLM prompts described in reference to FIGS. 4 and 6A. The LLM prompt 210 is thus provided as input (220) to the LLM 214, and the response 216 including the NL summary 218 is received as output (222) from the LLM 214.

The LLM 214 may be GPT-4 or newer (available from OpenAI, Inc.); Claude 3 Sonnet or Opus or newer (available from Anthropic PBC); Gemini Pro 1.5 or Ultra or newer (available from Google LLC); or Llama 3 70B Instruct or newer (available from Meta Platforms, Inc.); among others. The LLM 214 may be a pretrained LLM, which has not been trained for the purposes of providing an NL summary 218 of the selected anomalies 204, either in a pretraining stage in which the LLM is fed a large corpus to text to learn to predict the next word based on previous words, or in a finetuning stage in which the next word predictor is adapted to behave, for instance, as a chatbot.

Figure 3B:
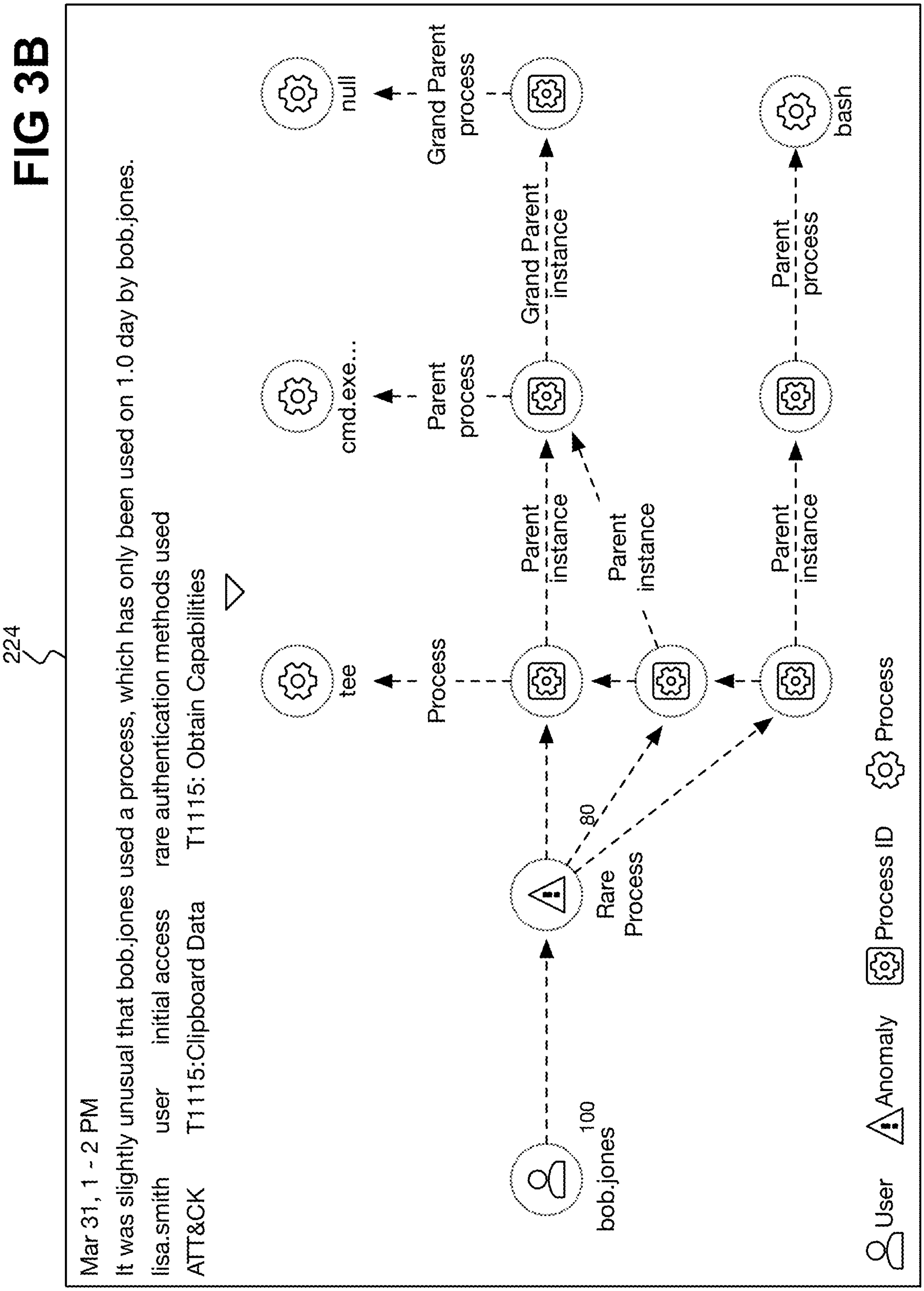
FIG. 3B is a diagram of an example graph visualization that may be generated in the process of FIG. 2A.

A graph visualization 224 of the enriched anomalies 204—an example of which is shown in FIG. 3B—may also be generated (226). For example, for a process anomaly 205, the graph visualization 224 may show the process hierarchy of the process specified by the process anomaly 205. Such a graph visualization 224 provides a way for the security threat hunter to understand the processes involved in the anomaly 205. The graph visualization 224 may be interactive in nature, permitting a user to select different processes to view information regarding them, for instance.

An action can be performed (228) in the process 200 based on the NL summary 218 and/or the graph visualization 224. For example, the action can include outputting the NL summary 218 along with the graph visualization 224, such as displaying the summary 218 and the visualization 224 on a display device for static or dynamic viewing by a security threat hunter. The action can also be more active in nature, such as by performing an action to resolve or limit an impact of the selected anomalies 204 on the entities 102 that they are related to, particularly where the anomalies 204 are actual anomalies (i.e., they are actual security issues).

In this respect, the prompt 210 may be generated to also solicit from the LLM 214 as part of the response 216 an indication as to whether the selected anomalies 204 are actual security anomalies occurring on their related entities 102. The entities 102 may be reconfigured in order to resolve the anomalies 204, or the entities 102 may be quarantined to limit their impact. The prompt 210 may be generated to solicit a recommended fix to resolve the selected anomalies 204 at their related entities 102, such as how the entities 102 are to be reconfigured so that the anomalies 204 are at least partially resolved. The action may be automatically applied without user interaction.

The process 200 that has been described provides for the following advantages. Anomalies 204 without context can be difficult to understand, and therefore by enriching the anomalies 204 with additional information 208 it is easier for cybersecurity analysts such as security threat hunters to interpret them. Composing the summary 218 in natural language via utilization of an LLM 224, as well as generation of a graph visualization 224 particularly makes the context in which the anomalies 204 are occurring easier to understand.

The process 200 thus automatically generates easy-to-consume textual NL summaries 218 of insights for anomalous activities, such as anomalies 204 including rare process anomalies 205. In the case of rare process anomalies 205 in particular, additional information 208 concerning their specified processes, such as statistics and information regarding their process lineage (i.e., hierarchy), command-line instructions, and so on, can be used. Other additional information 208 may also be used to enhance process anomalies.

Figure 2B:
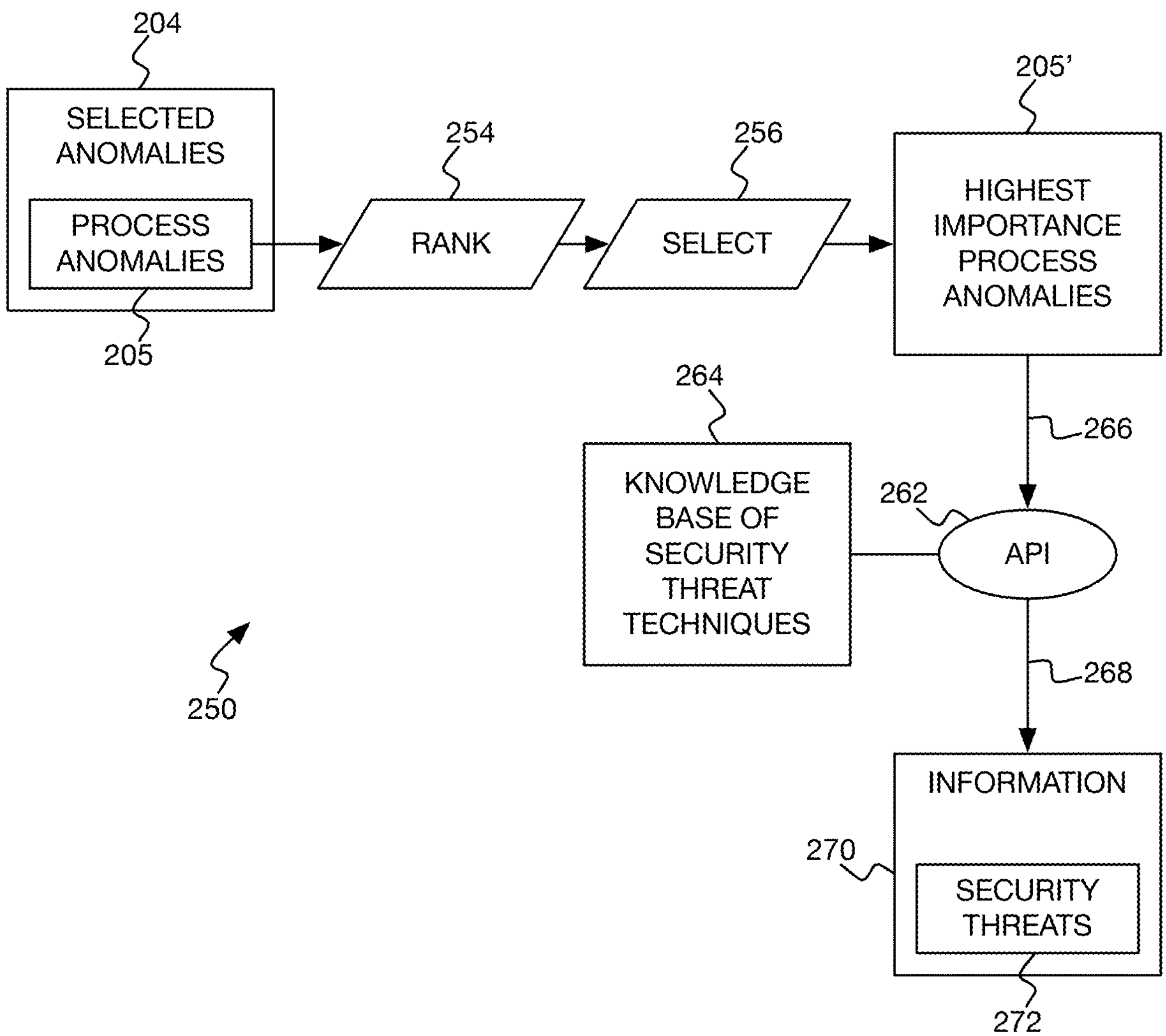
FIG. 2B is a diagram of an example process for enriching the selected anomalies in the process of FIG. 2A.

FIG. 2B shows an example process 250 for enriching those of selected anomalies 204 that are process anomalies 205 with one other such additional information 208. The process 250 can be performed as part of (206) in the process 200 of FIG. 2A. The process anomalies 205 are each ranked (254) based on its contribution to the overall risk of the corresponding entity 102 on which the anomaly 205 in question has been executing.

For instance, for each entity 102, the overall risk of the entity 102 may be provided by the initial security analysis 108. The risk of the entity 102 may be in the form of a risk score, as described above. The contribution of the process specified by a process anomaly 205 to this overall risk can be quantified. As one example, the security analysis 108 may be able to be queried to evaluate the overall risk of the entity 102 if the process anomaly 205 had not occurred, which in turn permits the contribution of the process to overall entity risk to be quantified.

Once the process anomalies 205 have been ranked by their contribution to overall risk, a subset thereof can be selected (256) as the process anomalies 205' having the highest importance. A threshold number or percentage of the process anomalies 205 that have a highest contribution to overall risk may be selected. As another example, the process anomalies 205 that have that each have a contribution to overall risk greater than a threshold contribution may be selected.

The process of each process anomaly 205' has a hash, which may also be referred to as a process hash, and which is present in raw events 104 relating to the process. A knowledge base 264 of security threats is organized by these process hashes. The knowledge base 264 may be the MITRE ATT&CK® knowledge base of security threats, including adversary tactics and techniques, which has been developed on the basis of real-world observations of security threats. This particular knowledge base is available on the Internet at the website having the universal resource locator (URL) address attack.mitre.org.

The knowledge base 264 may thus have an application programming interface (API) 262 that can be called using a process hash to retrieve information regarding security threats stored in the knowledge base 264 that the process having this hash is related to. That is, the knowledge base 264 is queryable by process hash, and for a provided hash, indicates whether the process in question is malicious, and if so, information regarding why the process is malicious, such as the security threats that have been identified as running this process.

The API 262 for the knowledge base 264 is therefore called (266) via a request including the hash of a process of a process anomaly 205' to retrieve (268) information 270 regarding any security threats 272 that the process having this hash has been identified in the knowledge base 264 as being related to. The information 270 in turn can be included in the additional information 208 used to enrich the process anomaly 205 in question in FIG. 2A, on which basis the LLM prompt 210 is then generated. As such, the NL summary 218 of the response 216 returned by the LLM 214 can summarize this information 270.

Figure 4:
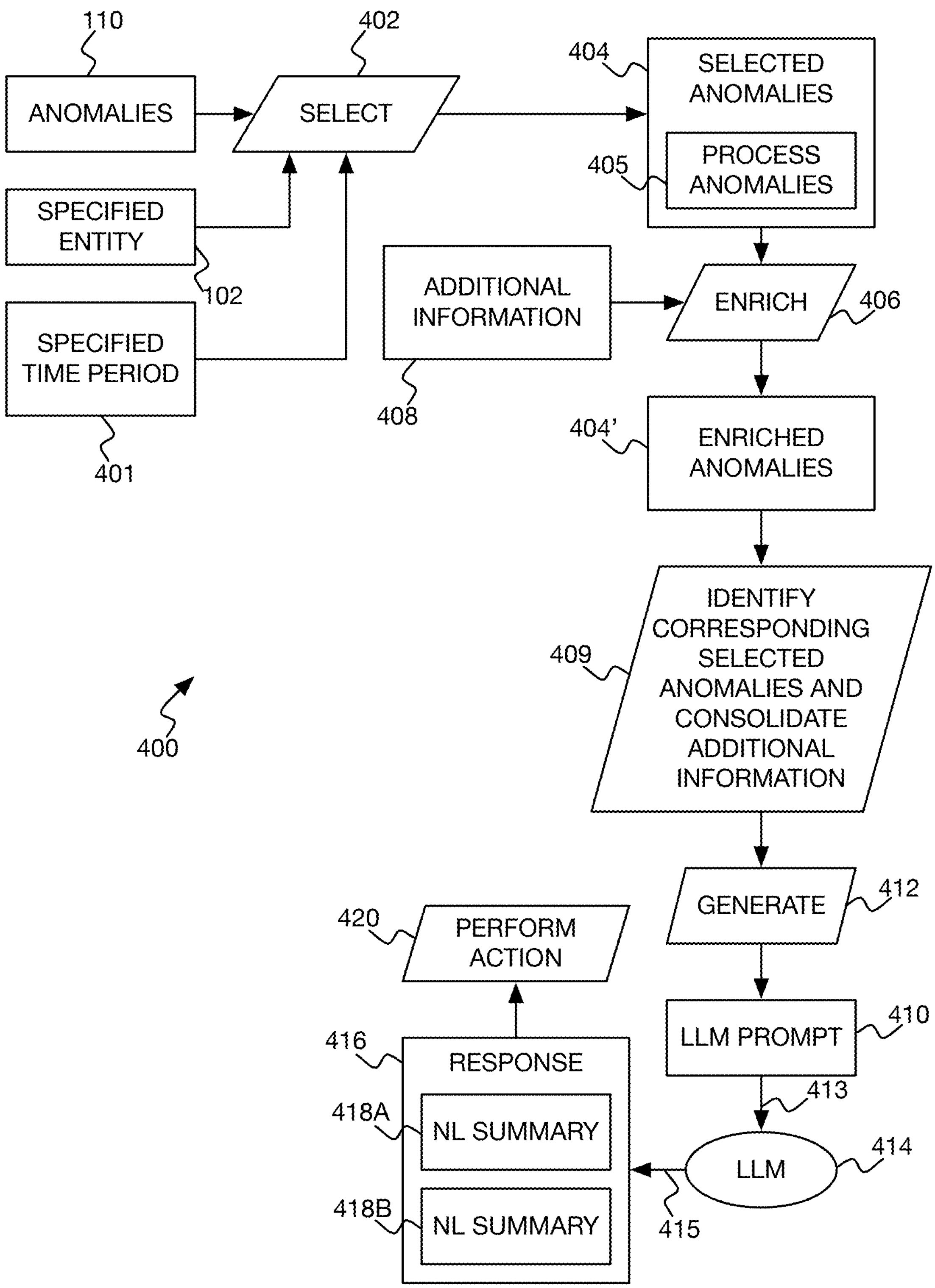
FIG. 4 is a diagram of a second example process to generate a NL summary synthesizing selected anomalies identified for a specified entity that occurred within a specified time period.

FIG. 4 shows an example process 400 for generating an NL summary synthesizing selected anomalies 110 that occurred within a specified time period 401 for a specified entity 102. Like the process 200 of FIG. 2A, the process 400 may be realized as a method performed by a computing system, and may be implemented by program code stored on a non-transitory computer-readable data storage medium that a processor executes to perform the method.

The process 400 can assist a security threat hunter in understanding the anomalous behavior of a risky entity 102. For example, an entity 102 for which the initial security analysis 108 has generated a risk score for a given time period 401 that is greater than a threshold may be classified as a risky entity. The process 400 permits the security threat hunter to understand the anomalies 110 that resulted in the entity 102 having the risk score, without necessarily having to review each individual anomaly 110.

For a specified entity 102 that may have been identified as a risky entity due to the anomalies 110 occurring within a specified time period 401, the process 400 therefore includes selecting (402) those anomalies 110 regarding the specified entity 102 which occurred within the specified time period 401 in question. These selected anomalies 404 can include process anomalies 405, as described above with reference to FIG. 2A.

The anomalies 404 selected in the process 400 are different than the anomalies 204 selected in the process 200 of FIG. 2A, but can overlap the anomalies 204. In particular, at least one of the anomalies 404 may be one of the anomalies 204. For instance, while the process 200 may concern identifying rare anomalies 204 over all the entities 102, the process 400 concerns identifying anomalies 404 regarding a specified entity 102 that occurred within a specified time period 401.

The anomalies 404 may thus include anomalies that are rare, but likely also includes anomalies that are not rare. The process 400 is not per se concerned with providing an NL summary of a particular anomaly to permit a security threat hunter to better and quickly understand that anomaly, in contradistinction to the process 200. Rather, the process 400 is concerned with providing an NL summary that synthesizes the anomalies 404 regarding a specified entity 102 which occurred within a specified time period 401, to permit a security threat hunter to quickly understand the risky behavior of the entity 102.

The selected anomalies 404 are each enriched (406), or enhanced, with additional information 408. The enhancement of the selected anomalies 404 with information 408 can be achieved in the same or different manner that has been described above with reference to FIG. 2A in relation to the selected anomalies 204. The selected anomalies 404 as enriched with additional information 408 are identified in FIG. 4 as the enriched selected anomalies 404'.

The enriched selected anomalies 404' can include duplicates. That is, within a given specified time period 401, the same type of anomaly 404 may have been identified by the initial security analysis 108 as occurring multiple times. To ensure that the NL summary that is generated in the process 400 is as succinct as possible, duplicative additional information 408 regarding such corresponding anomalies 404' can be removed. Therefore, corresponding selected anomalies 404' are identified, and their additional information 408 consolidated to prevent the additional information 408 from being duplication during generation of an LLM prompt 410 (409).

The LLM prompt 410 is therefore generated (412) based on the selected anomalies 404', as to which the additional information 408 has been consolidated, to input to an LLM 414. The LLM 414 may be the same LLM 214 used in FIG. 2A or a different LLM. The prompt 410 is generated to solicit a response 416 from the LLM 414 that can include NL summaries 418A and 418B that each synthesize the selected anomalies 404 regarding the specified entity 102 which occurred within the specified time period 401. The LLM prompt 410 is thus provided as input (413) to the LLM 414, and the response 416 including the NL summaries 418A and 418B is received as output (415) from the LLM 414.

Examples of the NL summaries 418A and 418B are respectively shown in FIGS. 5A and 5B. The difference between the NL summaries 418A and 418B can be that the summary 418A is a compact synthesis of the selected anomalies 404 and therefore a relatively brief summary of the anomalous behavior of the specified entity 102. By comparison, the summary 418B is a verbose synthesis of the selected anomalies 404 and therefore a relatively long exposition of this behavior.

The summary 418A may be displayed to and viewed by the security threat hunter, for instance, whereas the summary 418B may be used to generate an LLM to solicit a different type of NL summary altogether, as described with reference to FIG. 6A below. Examples of NL summaries 418A and 418B that can be generated are also described below. Described below as well is an example of the generalized from of the LLM prompt 410, as well as prompts described in reference to FIGS. 2A and 6A.

An action can be performed (420) in the process 400 based on at least the NL summary 418A included in the response 416 received as output from the LLM 414. Similar to the action performed in (228) in FIG. 2A, the action can include outputting at least the NL summary 418A. As has been described above with reference to FIG. 2A, the action may also be more active in nature, such as by performing an action to resolve or limit an impact of the selected anomalies 404 on the specified entity 102, particularly where the anomalies 404 actual security anomalies (i.e., they are actual security issues).

In this respect, the prompt 410 may be generated to also solicit from the LLM 414 as part of the response 416 an indication as to whether the selected anomalies 404 are actual security anomalies. The specified entity 102 may be reconfigured in order to resolve the anomalies 404, or it may be quarantined to limit their impact. The prompt 410 may be generated to solicit a recommended fix to resolve the selected anomalies 404 at the entities 102, and may be automatically applied without user interaction.

The process 400 that has been described provides for the following advantages. The initial security analysis 108 that is performed may analyze a large amount data in the form of raw events 104, identifying anomalies 110 and aggregating them to compute risk scores for different entities 102. While this reduces the amount of time required for security investigations, analysts such as security threat hunters still have to individually examine a multitude of anomalies 110 for each risky entity 102 to get a sense of the anomalous behavior of the risky entity 102 (e.g., identify whether there is an actual security threat for each such entity 102).

The process 400 thus reduces the cognitive load on such analysts by providing an NL summary 418A for each risky entity 102 using generative AI. The NL summary 418A may highlight the most concerning behaviors that contributed to the increased risk of an entity 102. This allows the analysists to quickly gain an understanding into the risky activities of an entity 102 and determine whether the entity 102's behavior requires further investigation.

Figure 6A:
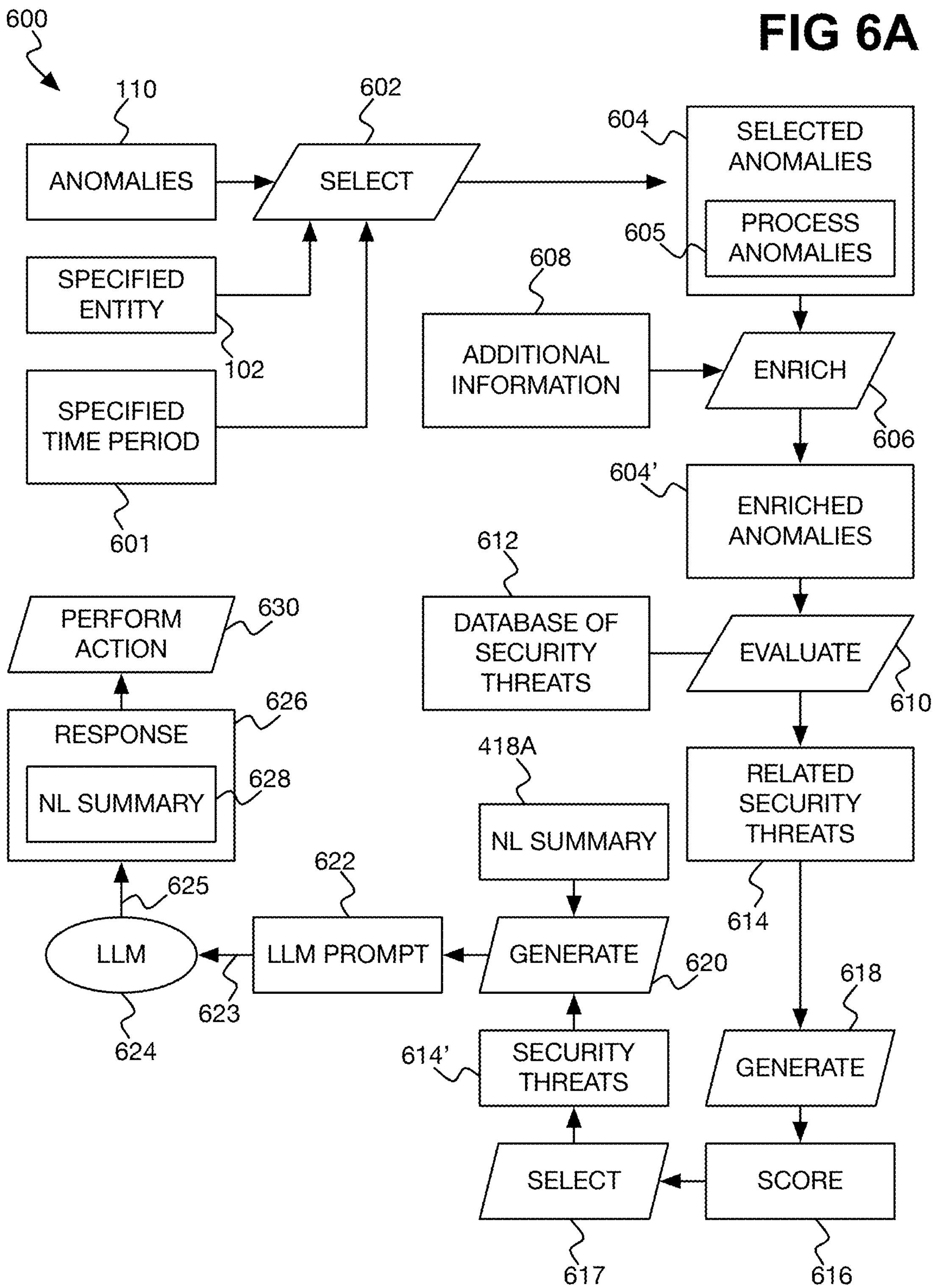
FIG. 6A is a diagram of a third example process to generate a NL summary associating security threats with selected anomalies identified for a specified entity which occurred within a specified time period.

FIG. 6A shows an example process 600 for generating an NL summary associating security threats with selected anomalies 110 that occurred within a specified time period 601 for a specified entity 102. Like the processes 200 and 400 of FIGS. 2A and 4, the process 600 may be realized as a method performed by a computing system, and may be implemented by program code stored on a non-transitory computer-readable data storage medium that a processor executes to perform the method.

The process 600 can assist a security threat hunter in understanding the security threats that a risky entity 102 may be being subject to. The process 600 is thus related to but different than the process 400 of FIG. 4. Whereas the process 400 permits a security threat hunter to gain an understanding of the anomalous behavior of the entity 102, it is not particularly focused on understanding the security threats that are associated with this anomalous behavior. The information generated in the process 400, particularly the NL summary 418B, may, however, be used in the process 600 to generate an NL summary of the threats associated with the anomalous behavior.

Similar to in the process 400, for a specified entity 102, the process 600 includes selecting (602) those anomalies 110 regarding the specified entity 102 which occurred within the specified time period 601 in question. These selected anomalies 604 can include process anomalies 605, as described above with reference to FIG. 2A.

The anomalies 604 selected in the process 600 may be the same anomalies 404 selected in the process 400. Stated another way, the process 600 may concern the same anomalies 110 that the process 400 concerns, but as noted above, provides a security threat hunter with a different understanding as to the anomalies 110 than the process 400 does. The selected anomalies 604 can each be enriched (606), or enhanced, with additional information 608, as in FIGS. 2A and 4. As enriched, the anomalies 604 are identified in FIG. 6A as the (enriched) selected anomalies 604'.

The selected anomalies 604' are each evaluated (610) against a database 612 of security threats to identify the security threats 614 that the anomaly 604' is related to. The database 612 is different than the knowledge base 264 of security threats that has been described above in reference to FIG. 2B, but can concern the same security threats. An example implementation of the database 612 is described below in relation to FIG. 6B, and how that database 612 is then evaluated for a given anomaly 604' to identified related security threats 614 is described below in relation to FIG. 6C.

For each related security threat 614, a score 616 is generated (618). The score 616 of a security threat 614 indicates the likelihood that, within the specified time period 601, the specified entity 102 has been subjected to the threat 614. In one example implementation, the higher the score 616 of a security threat 614, the more likely the specified entity 102 was being subjected to the threat 614 within the specified time period 601. One technique by which the scores 616 can be generated is described below with reference to FIG. 6C.

A subset 614' of the identified security threats 614 is then selected (617) based on the generated scores 616 of the threats 614 (621). For example, a threshold number or percentage of the security threats 614 that have the highest scores 616 may be selected as the subset 614'. A LLM prompt 622 is then generated (620) based on the selected subset 614' of the identified security threats 614, and based on the NL summary 418A generated in FIG. 4, to input to an LLM 624.

By being (partially) generated based on the NL summary 418A, the LLM prompt 622 is indirectly (partially) generated based on the selected anomalies 604' as enriched by additional information 608. This is because the NL summary 418A is itself generated based on selected anomalies 404' as enriched by additional information 408. However, in other implementations, the LLM prompt 622 may be generated based directly on the anomalies 604' as enhanced by additional information 608 and based on the selected subset 614' of security threats 614.

The LLM 624 may be the same as either or both of the LLMs 214 and 414 of FIGS. 2A and 4, or may be an entirely different LLM. The prompt 622 is generated to solicit a response 626 from the LLM 624 that includes an NL summary 628 associating the security threats 614 (specifically the subset 614' thereof) with the selected anomalies 604'. The LLM prompt 622 is provided as input (623) to the LLM 624, and the response 626 including the NL summary 628 is received as output (625) from the LLM 624. An example of an NL summary 628 is shown in FIG. 7.

An action can be performed (630) in the process 600 based on the NL summary 628 included in the response 626 received as output from the LLM 624. Similar to the actions performed in (228) and (420) in FIGS. 2A and 4, the action can include outputting at least the NL summary 628. As has been described above with reference to FIG. 2A, the action may also be more active in nature, such as by performing an action to resolve or limit an impact of the identified security threats 614 (particular the subset 614' thereof) on the specified entity 102, including reconfiguring and/or quarantining the entity 102.

The process 600 that has been described provides for the following advantages. The initial security analysis 108 that is performed may analyze a large amount data in the form of raw events 104, identifying anomalies 110, and aggregating them to compute risk scores for different entities 102. While this reduces the amount of time required for security investigations, analysts such as security threat hunters may still have to determine which security threats, if any, each risky entity 102 is being subjected to and which resulted in the anomalies 110 being identified on that entity 102.

The process 600, as with the process 400, thus reduces the cognitive load on such analysts by providing an NL summary 628 associating the security threats 614 (particularly the subset 614') with the anomalies 110 (particularly the selected anomalies 604) identified for the risky entity 102, using generative AI. The analysts can therefore quickly gain an understanding into the risky activities of an entity 102, how they may be a result of the entity 102 being subjected to various security threats 614, and thus whether the entity 102's behavior requires further investigation.

Figure 6B:
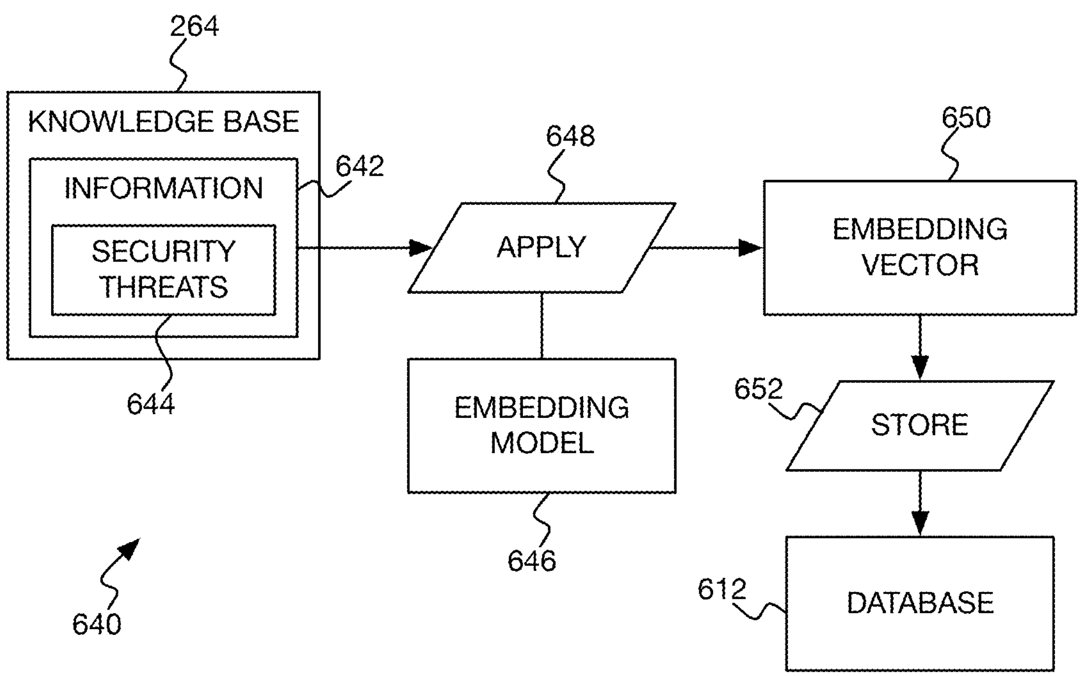

FIG. 6B shows an example process 640 for generating the database 612 of security threats against which selected anomalies 604' are evaluated in the process 600 of FIG. 6A. The database 612 is generated by processing the information 642 regarding each security threat 644 stored in the knowledge base 264. The database 612 is generated using a specified embedding model 646.

An embedding, which can also be referred to as a vector embedding, numerically represents information, such as text, in a format that can then be used for subsequent analysis. An embedding may be a vector of floating-point numbers, such that the distance between two embeddings in vector space is correlated with semantic similarity between two inputs in their original format. For example, if two texts are similar, then their vector embedding representations likely are also similar. Such high-dimensional representations thus capture semantic meaning of information like text, making it easier to perform subsequent analyses and other tasks on the text.

An example of an embedding model is the Word2Vac model, which is a natural language processing (NLP) neural network machine learning model available on the Internet at the website having the URL address code.google.com/archive/p/word2vec/. Types of Word2Vec models include the continuous bag of words (CBOW) and the skip-gram models.

Other example embedding models include the GloVe model, which is an unsupervised learning machine learning model available at the website having the URL address nlp.stanford.edu/projects/glove; and the FastText model, which is an enhancement to the Word2Vac model and is available at the URL address fasttext.cc. Still other example embedding models include the BERT model, which employs self-supervised learning and uses an encoder-only transformer architecture, and which is described at the web page available at the URL address arxiv.org/abs/1810.04805; and the Universal Sentence Encoder model, which is an extension of the of the BERT model in the TensorFlow machine learning platform software library.

For each security threat 644, the embedding model 646 is applied (648) to the information 642 stored in the knowledge base 264 for that threat 644 to generate a corresponding embedding vector 650. The vector 650 for a given security threat 644 thus captures a semantic representation of the information regarding the threat 644 within the knowledge base 264. The database 612 is therefore generated by storing (652) each vector 650 within the database 612. The database 612 is organized so that the embedding vectors 650 can be quickly queried via an input embedding vector to identify which vectors 650 the input vector is related to, and thus which threats 644 have information 642 related to the information semantically represented by the input vector.

Figure 6C:
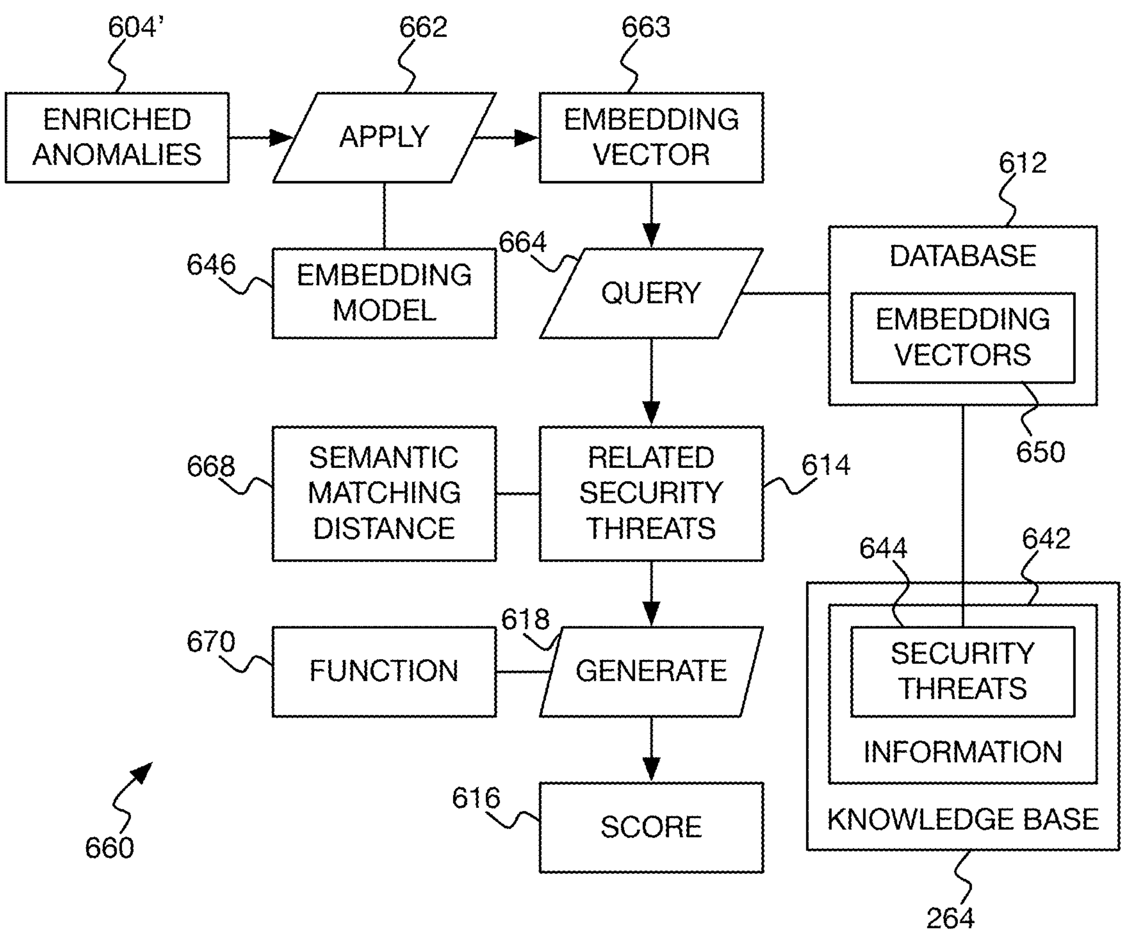
FIG. 6C is a diagram of an example process for evaluating selected anomalies against the database, as generated in the process of FIG. 6B, to identify the security threats they are related to and for generating a score for each security threat in the process of FIG. 6A.

FIG. 6C shows an example process 660 for evaluating the database 612 in the case in which it is a vector embedding database, such as which may be generated per FIG. 6B, for evaluating the selected anomalies 604 (particularly the anomalies 604' as enhanced with additional information 608) against the database 612 in FIG. 6A. The evaluation of a given anomaly 604 against the database 612 is used to identify the security threats 614 related to the anomaly 604'. The process 660 can further generate the score 616 for the anomaly 604' that has been described above with reference to FIG. 6A.

The specified embedding model 646 used to generate the embedding vectors 650 for the security threats 644 in FIG. 6B is applied to each enriched selected anomaly 604' to generate a corresponding embedding vector 663. The embedding vector 663 for a given anomaly 604' captures the semantic representation of that anomaly 604'. For each selected anomaly 604', the database 612 of the embedding vectors 650 for the security threats 644 is then queried (664)

using the corresponding embedding vector 663 to identify the security threats 614 related to the anomaly 604'.

The security threats 644 that are returned by querying the database 612 for the embedding vector 663 of an anomaly 604' may be governed by a matching criterion as to what is considered a related security threat 644. For example, the matching criterion may be specified as a numeric or percentage threshold, such that a threshold number or percentage of the security threats 644 having embedding vectors 650 semantically closest to the embedding vector 663 for the anomaly 604' are returned. As another example, the matching criterion may be specified such that the security threats 644 that have embedding vectors 650 with semantic matching distances 668 to the embedding vector 663 greater than a threshold are returned.

Along with the identification of the related security threats 644 for a selected anomaly 604', the semantic matching distance 668 of the embedding vector 650 for each such threat 644 is also returned when querying the database 612. The result of evaluating each selected anomaly 604 against the database 612 is therefore a set of security threats 614 that the specified entity 102 may have potentially experienced within the specified time period 601. Each security threat 614 is related to one or more anomalies 604'. That is, the collection of security threats 614 includes the threats 614 related to any anomaly 604'.

For each security threat 614, the score 616 described in reference to FIG. 6A above can be generated. The score 616 for a security threat 614 generally indicates or corresponds to the likelihood that the specified entity 102 has actually experienced this threat 614 within the specified time period 601. The score 616 for a security threat 614 can be specifically generated by using a function 670 in the process 660.

The function 670 may return the score 616 for a security threat 614 based on a number of parameters. Example such parameters can include, for instance, the total number of selected anomalies 604' that have been identified as being related to the security threat 614. The example parameters may also or instead include the total number of process anomalies 605 included in the selected anomalies 604' that are related to the security threat 614.

Other example parameters include the minimum semantic matching distance of a security threat 614 to those anomalies 604' that have been identified as being related to the threat 614. This parameter is more specifically the minimum semantic distance of the embedding vector 650 for the security threat 614 to the embedding vectors 663 for the anomalies 604' related to the threat 614. This parameter is thus the semantic distance 668 between the embedding vector 650 of the security threat 614 and the embedding vector 663 of the related anomaly 604' that is semantically most similar (i.e., closest) to the embedding vector 650.

Another example parameter is the average matching degree score of a security threat 614 as identified via evaluation against the security threats database 612 as compared to calling the API 262 for the security threats knowledge base 264. The average matching degree score of the threat 614 as identified via evaluation against the database 612 may be the average matching distance 668 between the embedding vector 650 for the threat 614 to the embedding vector 663 for each anomaly 604' that the threat 614 is related to.

The average matching degree score of the threat 614 that may be received when calling the API 262 for the knowledge base 264 may be the average likelihood between the threat 614 and each anomaly 604' that the threat 614 has been identified as being related to. Both average matching degree scores may be normalized to the same scale. The comparison between the two scores therefore provides a measure as to the extent to which the database 612 and the knowledge base 264 indicate that the security threat 614 is indeed a related threat.

Other parameters can also be used in the function 670. Furthermore, an example of the function 670 itself is:

$$score_{threat} = \left[(\text{Weight} * (1 - Dist_{min})) + \left((1 - \text{Weight}) * \frac{N_A}{N_P} * ApiMatch_{ave}\right)\right] * ProbImportance_{max}$$

In this equation, $score_{threat}$ is the score 616 for a given security threat 614, and Weight is a constant indicating how much the relative contribution of the semantic distance 668 between the security threat 614 and each anomaly 604' that the threat 614 has been identified as being related to should have when generating the score 616. For example, the value of Weight may be 0.8, indicating that 80% of the score 616 is governed by this information.

In the equation, $Dist_{min}$ is thus the aforementioned minimum semantic matching distance, whereas as described above, NA is the total number of selected anomalies 604' that a security threat 614 is related to, and NA is the total number of these anomalies 604' that are process anomalies 605. $ApiMatch_{avg}$ is the measure as to the extent to which the database 612 and the knowledge base 264 both indicate that the security threat 614 is indeed a related threat, as also described above.

Finally, $ProbImportance_{max}$ is the maximum probability importance for the security threat 614. The probability importance of an anomaly 604' is a measure of the contribution of the anomaly to the overall risk of the specified entity 102 within the specified time period 601. As noted above, the overall risk of the entity 102 may be in the form of a risk score provided by the initial security analysis 108. The maximum probability importance for the security threat 614 is thus the largest probably importance of any anomaly 604' that the security threat 614 has been identified as being related to.

Selecting a subset 614'*of* security threats in the process 600 of FIG. 6A utilizing the scores 616 generated in the process 660 of FIG. 6C and the database 612 as generated in the process 640 of FIG. 6B has been demonstrated to accurately identify the security threats 614 that have actually afflicted a specified entity 102 within a specified time period. The processes 600, 640, and 660 provide an improvement over standard RAG that grounds an LLM with information regarding known security threats 644, which as noted above has been found to result in suboptimal LLM-generated summaries that can include hallucinations and provide non-deterministic results.

The processes 200, 400, and 600 of FIGS. 2A, 4, and 6A each can stand alone, and thus they can be performed individually and separate from one another. However, two or more of the processes 200, 400, and 600 can be integrated with one another. For example, just the processes 200 and 400 may be performed, just the processes 200 and 600 may be performed, and so on. In one implementation, all three processes 200, 400, and 600 may be performed.

Figure 8:
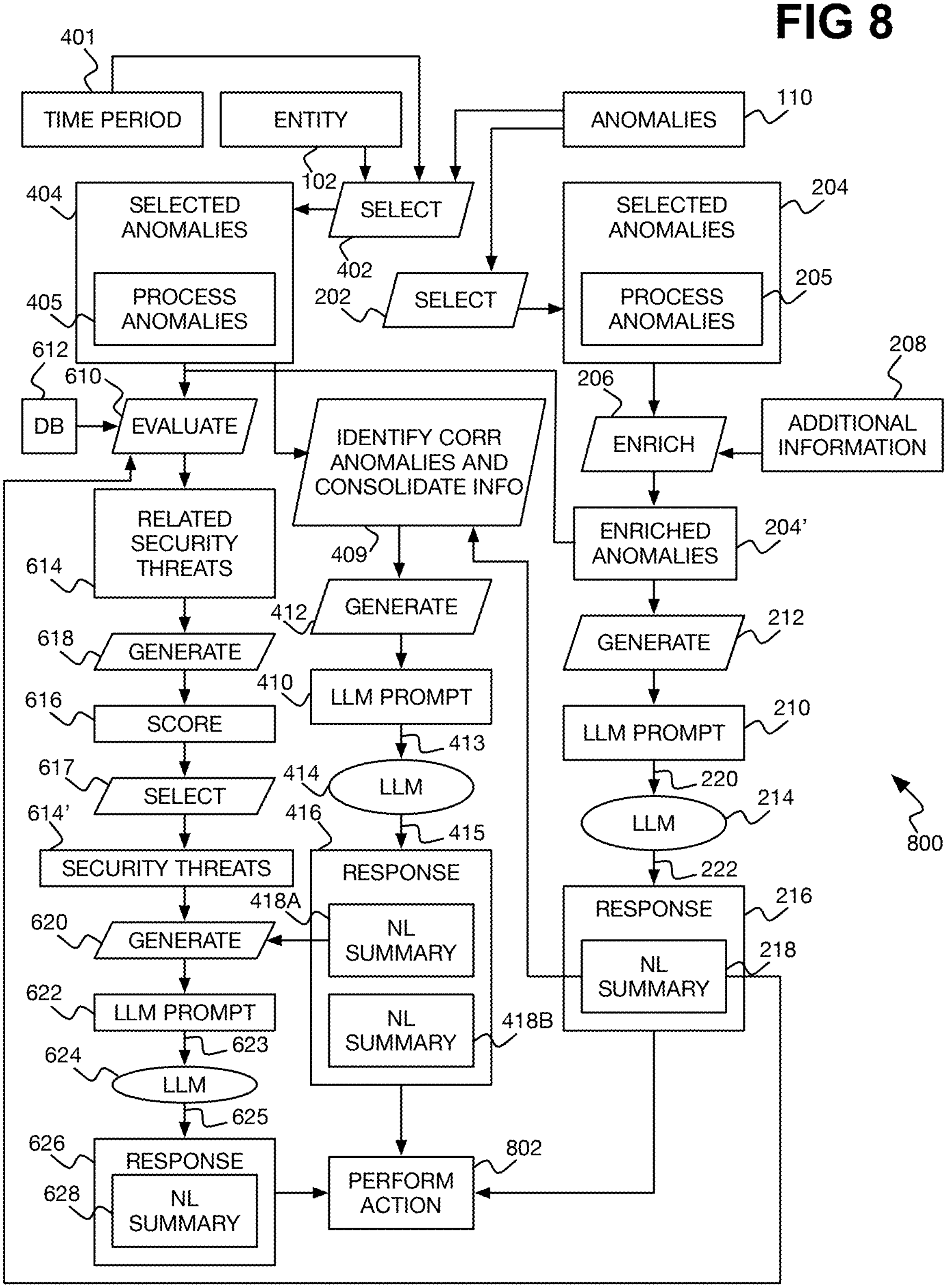
FIG. 8 is a diagram of an example process integrating the processes of FIGS. 2A, 4, and 6A to generate NL summaries regarding anomalies and security threats.

FIG. 8 shows such an example process 800 that integrates the processes 200, 400, and 600 of FIGS. 2A, 4, and 6A, in order to generate NL summaries regarding both anomalies and security threats. Like the processes 200, 400, and 600, the process 800 may be realized as a method performed by a computing system, and may be implemented by program code stored on a non-transitory computer-readable data storage medium that a processor executes to perform the method.

The process 800 integrates the process 200 of FIG. 2A as follows. The process 800 includes selecting (202) one or more anomalies 204 from the anomalies 110 that have been identified by the initial security analysis 108 performed on the raw events 104 regarding the entities 102. The selected anomalies 204 may be referred to as first anomalies, and can include process anomalies 205. The first anomalies 204 are enriched (206) with additional information 208, resulting in enriched first anomalies 204'. A first LLM prompt 210 is generated (212) based on the first anomalies 204' to solicit a first response 216 from a first LLM 214 including a NL summary 218 of the first anomalies 204. The LLM prompt 210 is thus provided as input (220) to the LLM 214, and the response 216 is received as output (222) from the LLM 214.

The process 800 integrates the process 400 of FIG. 4 as follows. The process 800 includes selecting (402) anomalies 404 from the anomalies 110 regarding a specified entity 102 which have occurred within a specified time period 401. The selected anomalies 404 may be referred to as second anomalies, and can include process anomalies 405. The second anomalies 404 may include at least one of the first anomalies 204, and in some cases, the second anomalies 404 may be a subset of the first anomalies 204.

Particularly in this latter situation, the second anomalies 404 can be matched against the first anomalies 204' (i.e., the first anomalies 204 as enriched with additional information 208). That is, the prior enrichment of the first anomalies 204 can be reused as enrichment of the second anomalies 404. If a second anomaly 404 is not one of the first anomalies 204, however, then it can be enriched in the same or different manner as used to enrich the first anomalies 204. Corresponding second anomalies 404 are identified and their information is consolidated (409), as described above with reference to FIG. 4.

Note that in the process 800 (as well as in the process 400 of FIG. 4), the information that is consolidated and subsequently used to generate (412) a second LLM prompt 410 can include the NL summary 218 of the first response 216 generated by the first LLM 214. Therefore, the second response 416 that the second LLM 414 generates can leverage the NL summary 218 that the first LLM 214 generated.

The second LLM prompt 410 is thus generated (412) to solicit the second response 416 from a second LLM 414 including NL summaries 418A and 418B that synthesize the second anomalies 404 regarding the specified entity 102 which occurred in the specified time period 401. The LLM prompt 410 is provided as input (413) to the LLM 414, and the response 416 is received as output (415) from the LLM 414.

The process 800 integrates the process 600 of FIG. 6A as follows. The second anomalies 404 that have been selected, as have been enriched, are each evaluated (610) against a database 612 to identify related security threats 614. The second anomalies 404 thus do not have to be selected again, but rather the second anomalies 404 that have been selected for generating the NL response 416 can be reused.

Note that in the process 800 (as well as in the process 600 of FIG. 6), the evaluation of the second anomalies 400 can consider the NL summary 218 of the first response 216 generated by the first LLM 214. A score 616 is generated (618) for each security threat 614, and a subset 614' of the security threats 614 is selected (617) based on their scores 616.

A third LLM prompt 622 is then generated (620) based on the subset 614' of security threats 614 and based on the NL summary 418A synthesizing the second anomalies 404, to solicit a third response 416 626 a third LLM 624. The third response 626 includes an NL summary 628 associating the security threats 614 with the second anomalies 404 regarding the specified entity 102 which occurred in the specified time period 401. The LLM prompt 662 is provided as input (623) to the LLM 624, and the response 626 is received as output (625) from the LLM 624.

An action can then be performed (802) in the process 600 based on the NL summaries 218, 418A, 418B, and/or 628. The action can include at least outputting at least one or more of these summaries 218, 418A, 418B, and/or 628. As has been described, the action may also be more active in nature, such as by performing an action to resolve or limit an impact of the identified security threats 614 (particular the subset 614' thereof) and/or the selected anomalies 204 and/or 404 on the specified entity 102, including reconfiguring and/or quarantining the specified entity 102.

Figure 9:
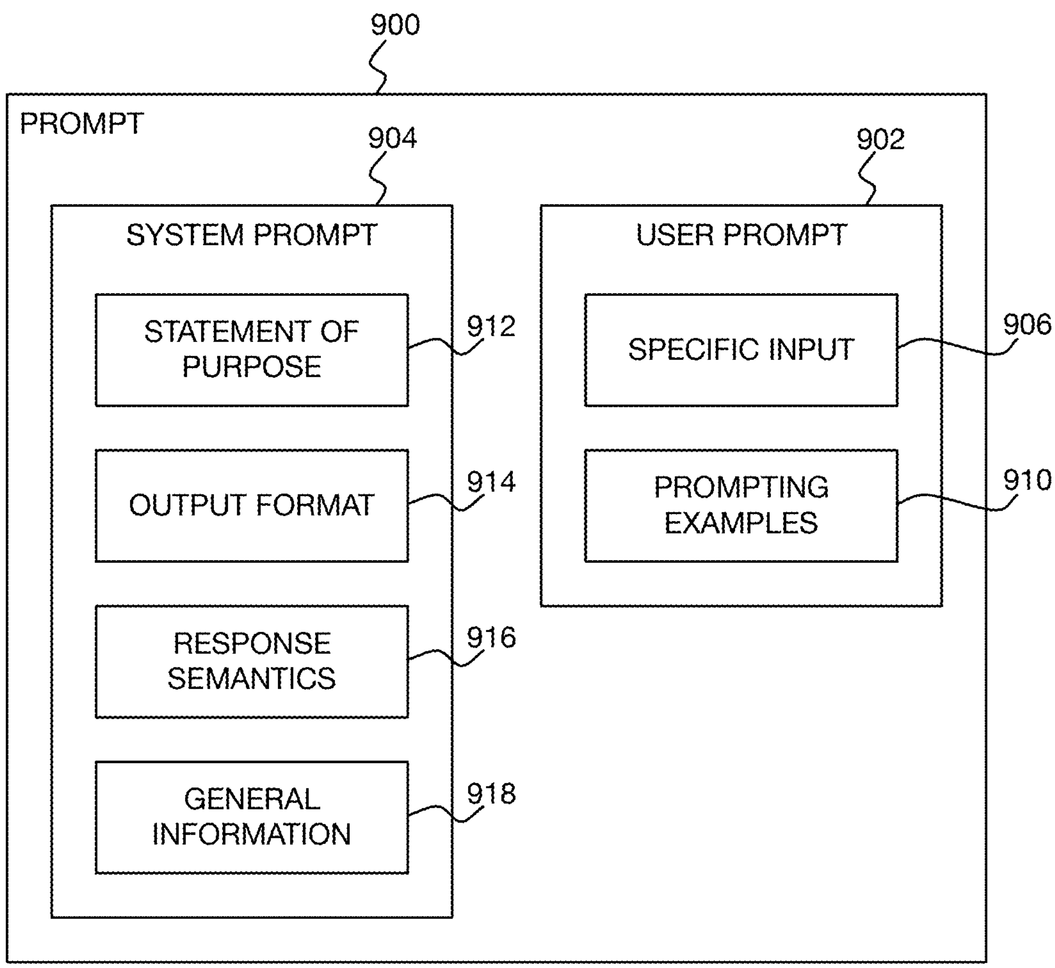
FIG. 9 is a diagram of an example large language model (LLM) prompt to solicit a response from an LLM to generate an NL response. Different instances of the prompt are used in the processes of FIGS. 2A, 4, and 6A.

FIG. 9 shows an example prompt 900 for providing as input to an LLM to solicit a response from the LLM including an NL summary. Different instances of the prompt 900 may be used to implement the LLM prompts 210, 414, and 624 of FIGS. 2A, 4, and 6A. In the depicted example, the prompt 900 can include a system prompt 904 and a user prompt 902. The system prompt 904 does not change each time the prompt 900 is generated, whereas the user prompt 902 does. It is noted that the terminology "user prompt 904" does not signify that a user (e.g., a security threat hunter) interacts directly with the LLM in the techniques herein, and is used to differentiate it from the system prompt 904.

For example, in the case in which an instance of the prompt 900 is used as the prompt 210 in FIG. 2A to generate an NL summary 218 for a given anomaly 204, the system prompt 904 is not specific to the anomaly 204, whereas the user prompt 902 is. In the case where an instance of the prompt 900 is used as the prompt 410 in FIG. 4 to generate NL summaries 418A and 418B synthesizing the anomalies 404 regarding a specified entity 102 that occurred within a specified time period 401, the system prompt 904 is not specific to the anomalies 404, the specified entity 102, or the specified time period 401, whereas the user prompt 902.

Similarly, in the case where an instance of the prompt 900 is used as the prompt 622 in FIG. 6A to generate an NL summary 628 associating related security threats 614 with anomalies 604 regarding a specified entity 102 that occurred within a specified time period 601, the system prompt 904 is not specific to the security threats 614, the anomalies 404, the entity 102, or the time period 601, whereas the user prompt 902 is. Furthermore, each of the prompts 902 and 904 may be a separate file formatted in a markup language, such as XML or JSON. The prompts 902 and 904 may be part of the same file as well, and the file or files may be formatted in a different way, too, such as in plain text.

Unlike as depicted in the figure, in other implementations, the prompt 900 may not be divided between a system prompt 904 and a user prompt 902. For example, there may just be a single prompt constituting the prompt 900. A particular LLM, for instance, may not accept separate system and user prompts 902 and 904. In this case, the information ascribed to each of the prompts 902 and 904 may be concatenated into a single prompt 900.

The system prompt 904 can include a statement of purpose 912 of the LLM as to its role and what the LLM is expected to do in generating a response. The statement of purpose 912 can be provided in natural language format. The statement of purpose 912 can provide limits to the LLM as to the information the LLM should consider when performing its analysis, and/or what information the LLM should consider.

The statement of purpose 912 may be multiple sentences to multiple paragraphs in length. The role that the LLM is to have may be provided as the type of human user the LLM is to behave as when generating a response, such as a security threat hunter. Providing this information may thus leverage whatever knowledge the LLM has as to how a human user would analyze input information in the capacity of being a security threat hunter, for instance, as opposed to analyzing this information in a manner that may otherwise be inscrutable when subjected to verification for correctness and completeness.

The system prompt 904 can include an output format 914 of the response that the LLM is to output. That is, when outputting the response, the LLM is expected to provide the response in the output format 914. The output format 914 may also be provided in natural language form, describing in human-readable form how various parts of the response are to be returned. The output format 914 may specify, for instance, the type of document that the LLM should output, and various elements in that document. For each element, the output format 914 may specify possible values that the LLM can select for the element.

The system prompt 904 can include response semantics 916 of the response that the LLM is to output. The semantics 916 may, for instance, provide information as to what the different values the LLM can choose from for various parts of the response, what the different values mean, and why the LLM may choose one value as opposed to another value.

The response semantics 916 can include information regarding other parts of the response as well. For instance, such other parts of the response can be considered as comments that include the justification of the LLM as to its reasoning, including the information that the LLM is expected to provide when generating the response.

The system prompt 904 can also include general information 918 regarding how the LLM is to generate a response. The general information 918 can be considered as instructions as to what the LLM is to do in order to fulfill the statement of purpose 912. These instructions may provide particular information as to the overall principles that the LLM is to keep in mind when generating the response. One such type of information includes policy decisions that the LLM is to take into account when generating the response.

Furthermore, the instructions can include particular knowledge that is not part of the LLM's base knowledge or a reiteration of things the LLM does know in principle, with the purpose of making the LLM specifically focus on this information. Being aware of this information may permit the LLM to better analyze input information.

The user prompt 902 includes a specific input 906 in relation to which the LLM is to generate a response. For example, in the case in which an instance the prompt 900 is used as the prompt 210 in FIG. 2A to generate an NL summary 218 for a given anomaly 204, the specific input 906 may be or include a given enriched anomaly 204'.

In the case where an instance of the prompt 900 is used as the prompt 410 in FIG. 4 to generate the NL summaries 418A and 418B synthesizing the anomalies 404 regarding a specified entity 102 that occurred within a specified time period 401, the specific input 906 may be or include at least the enriched anomalies 404'.

Similarly, in the case where an instance of the prompt 900 is used as the prompt 622 in FIG. 6A to generate an NL summary 628 associating related security threats 614 with anomalies 604 regarding a specified entity 102 that occurred within a specified time period 601, the specific input 906 may be or include at least the security threats 614 and the enriched anomalies 604'.

The user prompt 902 may also include prompting examples 910, which can assist the LLM in generating its response. In another implementation, the system prompt 904 may include the prompting examples 910, instead of the user prompt 902, if the prompt 900 includes the prompting examples 910. The prompting examples 910 may include example specific input 906 and a representative response corresponding to on the specific input 906. The prompting examples 910 are created by a user, such as a security threat hunter.

Where the prompting examples 910 are included, they may be particular to a given type of specific input 906, such as a particular type of anomaly 604 in the case of the process 200 of FIG. 2A, or a particular type of entity 102 in the case of the processes 400 and 600 of FIGS. 4 and 6A.

When no prompting examples 910 are provided, the resulting response generated by the LLM based on the prompt 900 is considered zero-shot prompting. That is, the LLM is asked to do something that it may not have been trained to do. For example, in FIG. 2A the LLM may be asked to generate a NL summary 218 for an anomaly 204; in FIG. 4 the LLM may be asked to generate NL summaries 418A and 418B synthesizing the anomalies 404; and in FIG. 6A the LLM may be asked to generate a NL summary 628 associating security threats 614 with anomalies 604.

By comparison, when one or more prompting examples 910 are provided, the resulting response generated by the LLM based on the prompt 900 is considered one-shot or few-shot prompting, depending on whether just one example 910 is provided or more than one example 910 is provided. Such prompting means that the LLM is still asked to do something that it may not have been trained to do—generating an NL summary per FIG. 2A, 4, or 6A—when examples 910 of the NL summary in question are provided to the LLM.

One- or few-shot prompting is akin to passing a small sample of training data to the LLM as part of the prompt 900, allowing the LLM to learn from the provided prompting examples 910. However, unlike during actual training of the LLM, such as in the pretraining or finetuning stages, the learning process does not involve updating the LLM (e.g., updating weights of the LLM that may have been specified during actual training). Instead, the LLM stays frozen but uses the provided examples 910 as context when generating the response.

Figure 10:
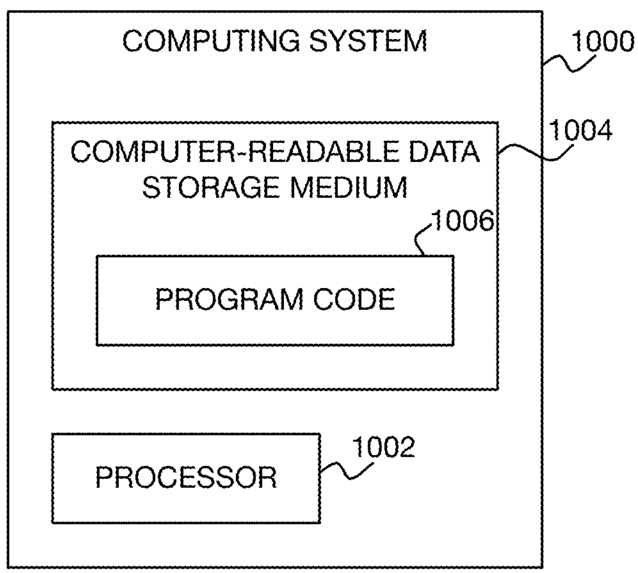
FIG. 10 is a diagram of an example computing system.

FIG. 10 shows an example computing system 1000, which may include one or more computing devices, such as servers or other types of computers. The computing system 1000 may be implemented in a distributed computing topology when it includes multiple computing devices. The computing system 1000 includes at least a processor 1002 and a non-transitory computer-readable data storage medium 1004, such as a memory other type of data storage medium. The data storage medium 1004 stores program code 1006 executable by the processor 1002 to perform processing, in order to realize one or more of the processes that have been described above.

Techniques have been described herein for generating NL summaries regarding anomalies that have been identified by initial, or preliminary, preliminary analysis performed on raw events regarding entities. The NL summaries can include summaries for respective individual anomalies, and/or summaries synthesizing anomalies regarding a specified entity that occurred within a specified time period. The NL summaries can additionally or instead include summaries associating security threats with anomalies regarding a specified entity that occurred within a specified time period. The NL summaries can assist threat hunters in understanding the anomalies that have been identified for entities and the actual security issues that may be afflicting them.

We claim:

1. A non-transitory computer-readable data storage medium storing program code executable by a processor to perform processing comprising:

selecting first anomalies from a plurality of anomalies identified by security analysis performed on a plurality of raw events regarding a plurality of entities;

enhancing the first anomalies with additional information;

selecting, from the plurality of anomalies, second anomalies regarding a specified entity of the plurality of entities which occurred within a specific time period, the second anomalies including at least one of the first anomalies;

generating a second prompt to input to a second large language model (LLM), the second prompt generated based on the second anomalies and based on the additional information with which the at least one of the first anomalies have been enhanced, the second prompt generated to solicit a second response including a natural language summary synthesizing the second anomalies;

providing the second prompt as input to the second LLM, and receiving the second response as output from the second LLM;

evaluating the second anomalies against a security threats database to identify security threats that the second anomalies are related to;

respectively generating scores for the identified security threats that the second anomalies are related to;

selecting a subset of the identified security threats that the second anomalies are related to, based on the scores;

generating a third prompt to input to a third LLM, the third prompt generated based on the selected subset of the identified security threats and based on the second response, the third prompt generated to solicit a third response including a natural language summary associating the identified security threats with the second anomalies;

providing the third prompt as input to the third LLM, and receiving the third response as output from the third LLM; and performing an action related to the identified security threats based on the second and third responses.

2. The non-transitory computer-readable data storage medium of claim 1, wherein performing the action comprises outputting the natural language summary of each of the second and third responses.

3. The non-transitory computer-readable data storage medium of claim 1, wherein performing the action comprises resolving or limiting an impact of at least the identified security threats at the specified entity.

4. The non-transitory computer-readable data storage medium of claim 3, wherein resolving or limiting the impact comprises either or both of:

reconfiguring the specified entity to resolve at least the identified security threats; and quarantining the specified entity to limit the impact of at least the identified security threats.

5. The non-transitory computer-readable data storage medium of claim 1, wherein the processing further comprises:

generating, based on the first anomalies as have been enriched with the additional information, a first prompt to input to a first LLM, the first prompt generated to solicit a first response including a natural language summary of the first anomalies; and providing the first prompt as input to the first LLM, and receiving the first response as output from the first LLM.

6. The non-transitory computer-readable data storage medium of claim 5, wherein performing the action comprises outputting the natural language summary of each of the first, second, and third responses.

7. The non-transitory computer-readable data storage medium of claim 5, wherein performing the action comprises resolving or limiting an impact of at least one of the first anomalies, the second anomalies, and the identified security threats.

8. The non-transitory computer-readable data storage medium of claim 5, wherein at least two of the first, second, and third LLMs are a same LLM, or each of the first, second and third LLMs is a different LLM.

9. The non-transitory computer-readable data storage medium of claim 1, wherein enhancing the first anomalies with the additional information comprises:

retrieving the raw events related to the first anomalies and on which basis the security analysis identified the first anomalies; and including the retrieved raw events within the additional information regarding the first anomalies.

10. The non-transitory computer-readable data storage medium of claim 1, wherein the first anomalies that have been identified by the security analysis include process anomalies that each specify a process that has been executing on a corresponding entity.

11. The non-transitory computer-readable data storage medium of claim 10, wherein enhancing the first anomalies with the additional information comprises, for the process specified by each process anomaly:

calling an application programming interface (API) for a knowledge base of the security threats to retrieve information regarding the security threats that the process is related to, based on a hash of the process; and including the retrieved information regarding the security threats that the process is related to within the additional information.

12. The non-transitory computer-readable data storage medium of claim 10, wherein enhancing the first anomalies with the additional information comprises, for the process specified by each process anomaly:

retrieving information regarding one or more than one of:

a process hierarchy of the process, including either or both of a parent process and a grandparent process of the process that have also been executing on the specified entity;

an importance level of the process;

a description of the process; a command-line instruction used to invoke the process;

an amount of time that the process has been executing on the specified entity; and an amount of time that the process has been executing on an entity group including the specified entity; and including the retrieved information within the additional information.

13. The non-transitory computer-readable data storage medium of claim 10, wherein respectively generating the scores for the identified security threats that the second anomalies are related to comprises, for each identified security threat:

generating a score for the identified security threat using a function based on:

a total number of the second anomalies that are related to the identified security threat; and a total number of the process anomalies included in the second anomalies that are related to the identified security threat.

14. The non-transitory computer-readable data storage medium of claim 1, wherein evaluating the second anomalies against the security threats database comprises, for each second anomaly:

generating an embedding vector capturing a semantic representation of the second anomaly;

querying the security threats database using the embedding vector to identify, as the security threats that the second anomaly is related to, a number of the security threats satisfying a matching criterion; and receiving, when querying the security threats database using the embedding vector, a semantic-matching distance between the embedding vector and each of the number of the security threats satisfying the matching criterion.

15. The non-transitory computer-readable data storage medium of claim 14, wherein the security threats database is an embedding vector database of embedding vectors for the security threats, wherein the embedding vector for each security threat captures a semantic representation of information regarding the security threat within a knowledge base of the security threats, wherein generating the embedding vector for each second anomaly comprises applying a specified embedding model to the second anomaly, and wherein the embedding vector for each security threat is generated by applying the specified embedding model to the information regarding the security threat within the knowledge base.

16. A method performed by a computing device and comprising:

selecting first anomalies from a plurality of anomalies identified by security analysis performed on a plurality of raw events regarding a plurality of entities;

enhancing the first anomalies with additional information;

generating, based on the first anomalies as have been enriched with the additional information, a first prompt to input to a first large-language model (LLM), the first prompt generated to solicit a first response including a natural language summary of the first anomalies; and providing the first prompt as input to the first LLM, and receiving the first response as output from the first LLM;

selecting, from the plurality of anomalies, second anomalies regarding a specified entity of the plurality of entities which occurred within a specific time period, the second anomalies including at least one of the first anomalies;

generating a second prompt to input to a second LLM, the second prompt generated based on the second anomalies and based on the additional information with which the at least one of the first anomalies have been enhanced, the second prompt generated to solicit a second response including a natural language summary synthesizing the second anomalies;

providing the second prompt as input to the second LLM, and receiving the second response as output from the second LLM;

evaluating the second anomalies against a security threats database to identify security threats that the second anomalies are related to;

respectively generating scores for the identified security threats that the second anomalies are related to;

selecting a subset of the identified security threats that the second anomalies are related to, based on the scores;

generating a third prompt to input to a third LLM, the third prompt generated based on the selected subset of the identified security threats and based on the second response, the third prompt generated to solicit a third response including a natural language summary associating the identified security threats with the second anomalies;

providing the third prompt as input to the third LLM, and receiving the third response as output from the third LLM; and performing an action based on the first, second, and third responses.

17. The method of claim 16, wherein performing the action comprises outputting the natural language summary of each of the first, second, and third responses.

18. The method of claim 16, wherein performing the action comprises resolving or limiting an impact of at least one of the first anomalies, the second anomalies, and the identified security threats.

19. The method of claim 18, wherein resolving or limiting the impact comprises either or both of:

reconfiguring the specified entity to resolve at least one of the first anomalies, the second anomalies, and the identified security threats; and quarantining the specified entity to limit the impact of at least one of the first anomalies, the second anomalies, and the identified security threats.

20. A computing system comprising:

a non-transitory computer-readable data storage medium storing program code; and a processor configured to execute the program code to perform a processing comprising:

selecting first anomalies from a plurality of anomalies identified by security analysis performed on a plurality of raw events regarding a plurality of entities;

enhancing the first anomalies with additional information;

generating, based on the first anomalies as have been enriched with the additional information, a first prompt to input to a first large-language model (LLM), the first prompt generated to solicit a first response including a natural language summary of the first anomalies; and providing the first prompt as input to the first LLM, and receiving the first response as output from the first LLM;

selecting, from the plurality of anomalies, second anomalies regarding a specified entity of the plurality of entities which occurred within a specific time period, the second anomalies including at least one of the first anomalies;

generating a second prompt to input to a second LLM, the second prompt generated based on the second anomalies and based on the additional information with which the at least one of the first anomalies have been enhanced, the second prompt generated to solicit a second response including a natural language summary synthesizing the second anomalies;

providing the second prompt as input to the second LLM, and receiving the second response as output from the second LLM;

evaluating the second anomalies against a security threats database to identify security threats that the second anomalies are related to;

respectively generating scores for the identified security threats that the second anomalies are related to;

selecting a subset of the identified security threats that the second anomalies are related to, based on the scores;

generating a third prompt to input to a third LLM, the third prompt generated based on the selected subset of the identified security threats and based on the second response, the third prompt generated to solicit a third response including a natural language summary associating the identified security threats with the second anomalies;

providing the third prompt as input to the third LLM, and receiving the third response as output from the third LLM; and performing an action based on the first, second, and third responses to resolve or limit an impact of at least one of the first anomalies, the second anomalies, and the identified security threats.

* * * * *